US007426063B2

(12) United States Patent
Shibasaki

(10) Patent No.: US 7,426,063 B2
(45) Date of Patent: Sep. 16, 2008

(54) SYSTEM AND APPARATUS FOR IMAGE-FORMATION, AND COMPUTER-READABLE FOR RECORDING MEDIUM RECORDING PROGRAM FOR THE SAME

(75) Inventor: Akira Shibasaki, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 882 days.

(21) Appl. No.: 09/985,682

(22) Filed: Nov. 5, 2001

(65) Prior Publication Data

US 2002/0054352 A1   May 9, 2002

(30) Foreign Application Priority Data

Nov. 7, 2000  (JP)  ............................ P2000-339371

(51) Int. Cl.
*H04N 1/387*  (2006.01)
(52) U.S. Cl. .................. 358/450; 358/1.9; 358/450; 358/452; 358/500; 382/167; 382/284
(58) Field of Classification Search .................. 358/2.1, 358/1.9, 450, 452, 500; 382/167, 284
See application file for complete search history.

(56) References Cited

U.S. PATENT DOCUMENTS

| | | | | |
|---|---|---|---|---|
| 5,150,458 A | * | 9/1992 | Masuzaki et al. ........... 345/636 |
| 5,294,993 A | * | 3/1994 | Sable ........................ 347/232 |
| 5,410,250 A | * | 4/1995 | Brown ....................... 324/309 |
| 5,732,230 A | * | 3/1998 | Cullen et al. ............... 715/764 |
| 5,790,765 A | * | 8/1998 | Kobayashi .................. 358/1.9 |
| 5,959,867 A | * | 9/1999 | Speciner et al. ............. 700/219 |
| 6,373,603 B1 | * | 4/2002 | Popovich et al. ............. 359/15 |

FOREIGN PATENT DOCUMENTS

| | | |
|---|---|---|
| JP | 63-256446 | 10/1988 |
| JP | 11-232001 | 8/1999 |
| JP | 2000-020271 | 1/2000 |
| JP | 2000-079736 | 3/2000 |
| JP | 2000-276586 | 10/2000 |
| JP | 2000-298564 | 10/2000 |

* cited by examiner

*Primary Examiner*—Twyler Lamb
*Assistant Examiner*—Yixing Qin
(74) *Attorney, Agent, or Firm*—The Nath Law Group; Jerald L. Meyer; Matthew J. Moffa

(57) ABSTRACT

An image-formation system includes an image display function which displays, at a display section, images of a plurality of desired original monochromatic images for output among original monochromatic images for output which are stored in an image storage means; a page combining function which forms an original multicolor image for output by combining, in page units, a plurality of images which are displayed at the display section; a color setting function which sets colors at a time of output from an image output means, for a plurality of images which are displayed at the display section; and a preview function which superposes images, which have been colored by the color setting function, so as to be in a state at the time of output from the image output means, and displays the images at the display section.

19 Claims, 11 Drawing Sheets

FIG.1
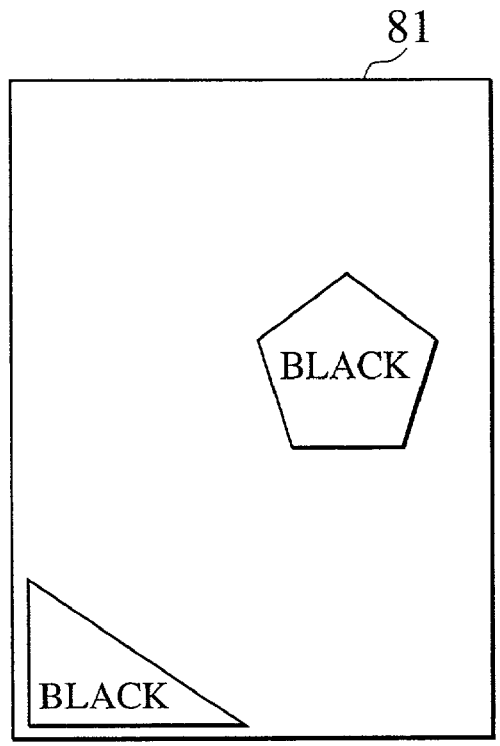
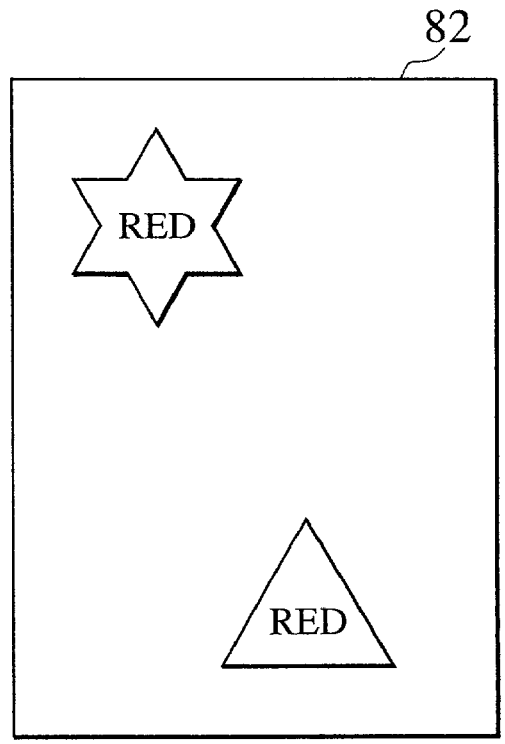
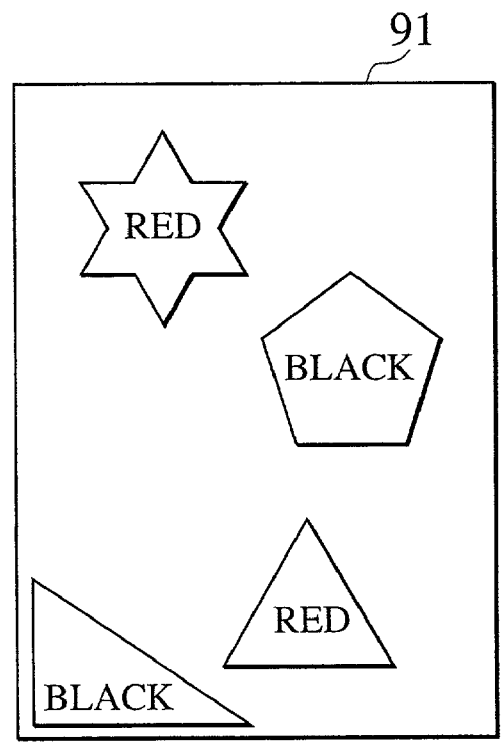
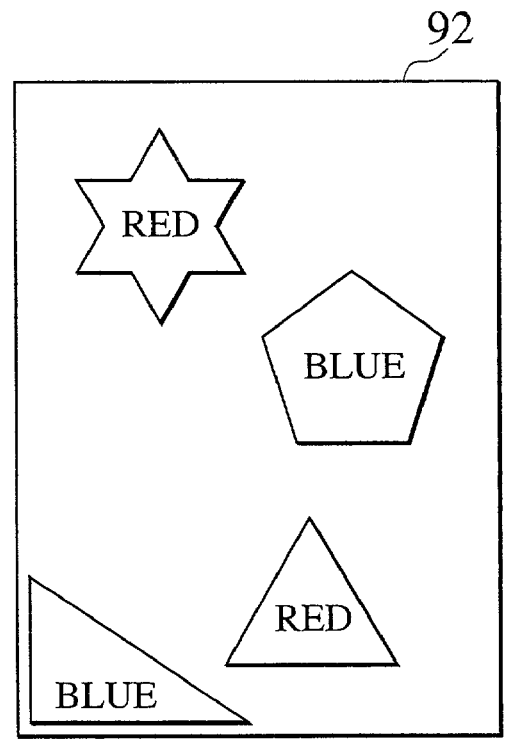

SYSTEM AND APPARATUS FOR IMAGE-FORMATION, AND COMPUTER-READABLE FOR RECORDING MEDIUM RECORDING PROGRAM FOR THE SAME

BACKGROUND OF THE INVENTION

1. Field of the Invention

The present invention pertains to an image-formation technique for image-formation data which is outputted by a multicolor printing apparatus or the like, and in particular, pertains to a system and apparatus for image-formation, and a computer-readable recording medium for recording a program for image-formation, thus forming multicolor printing data for output by combining original monochromatic image data for output.

2. Description of the Related Art

Conventionally, a (full) color printing apparatus is known as a printing apparatus which expresses images by using plural colors. A (full) color printing apparatus generally uses a system which reproduces (full) color by using color inks (or toners) of cyan, magenta, yellow, black (CMYK), and converts (color separation) the color information of a original image which is read by a scanner or a original image which is created by a personal computer or the like into CMYK, and in accordance with these combinations, produces a printed matter of a finish which approximates the original image. In this way, for example, expressing colors, which approximate the original colors using the four color inks of CMYK, is called "Process Color".

On the other hand, multicolor printing apparatus, which carries out multicolor printing by similarly using a plurality of color inks, is also known. For example, multicolor printing is realized by forming, per color ink which is individually prepared, an original image which is read by a scanner or created by a personal computer or the like, and printing this image information by superposing each color layers onto the object to be printed. This method of carrying out printing by using inks of individual colors is called "Spot Color". Because printing by "Spot Color" can reproduce colors more faithfully than "Process Color", printing by "Spot Color" is used in a broad range of fields such as DM (direct mail) and handbill advertisements, as well as cover sheets for magazines and books. Further, there is an advantage in that printing which uses special color inks such as fluorescent color inks or the like which cannot be expressed by "Process Color" can be carried out.

The object of a (full) color printing apparatus by "Process Color" is to make the color expression of a finished output image approximate the original image, whereas the object of a multicolor printing apparatus by "Spot Color" is to express original images, which are formed with each of a plurality of colors, by replacing them with respective color inks which are provided by the printing apparatus. In the multicolor printing apparatus, for example, in a case where two-color printing is carried out, as shown in FIG. 1, if printing is carried out by respectively superposing the original monochromatic image for black color of output 81 with black color ink which is loaded in the printing apparatus, and the two types of original images for output 82 for red color with red color ink which is loaded in the printing apparatus, a printed matter 91 which is printed with the two color inks of black and red is completed. Further, if the original monochromatic image for the black color of output 81 is printed with blue color ink which is loaded in the printing apparatus, a printed matter 92 which is printed with the two color inks of blue and red is completed.

In a case where an original image of a multicolor printing apparatus is formed, methods such as the following are generally used: as shown in FIG. 1, a method in which a number of original monochromatic images for output are created, corresponding to the colors and the number of the color inks loaded in the printing apparatus from the original image creating stage, and this image information is printed by being superposed per color layers onto the object to be printed; or a method in which original monochromatic images for output, which correspond to the color inks of the printing apparatus, are generated by extracting respective color components from the created original multicolor image for output, and these original monochromatic images for output are printed by being superposed each color layers; or the like.

In this way, when multicolor printing is carried out by combining a plurality of original monochromatic images for output, the user, after sufficiently recognizing the contents of the respective original monochromatic images for output, must send the originals to the printing apparatus in consideration of these combinations. However, because there is no effective means of confirmation, problems such as operator error and the like easily occur.

If respective original monochromatic images for output are on single page, the combinations to be considered are comparatively simple. For example, as shown in FIG. 2, there are five pages of original black monochromatic images for output 61 through 65. In a case where the page numbers of the respective original monochromatic images for output differ so that the original red monochromatic image of output 71 is superposed onto the first page, and the original red monochromatic image of output 72 is superposed onto the fourth page, there is cause for the user to be confused.

Moreover, if a page has to be added to or deleted from the original black monochromatic images for output 61 through 65, because the combination destination of the original red monochromatic image for output 72 has been changed, operation error and the like easily occur, causing problems such as misprint and the like.

The greater the number of pages of the respective original monochromatic images for output, the easier confusion occurs. Further, if the number of colors of original monochromatic images for output increases, the system becomes more complicated.

SUMMARY OF THE INVENTION

The present invention has been achieved in order to solve the above problems. An object of the present invention is to provide a system and an apparatus for image-formation, and a computer-readable recording medium recording a program for image-formation, in which, in a case where multicolor printing is carried out by combining original monochromatic images for output, setting and confirmation of the combinations of the original monochromatic images for output can be easily carried out, and images can be obtained which are just as the user intended when printed.

In order to solve the problems described above, a system for image-formation in one embodiment according to the present invention is characterized in that the system includes: (a) an image input apparatus configured to create an original monochromatic image for output, the original monochromatic image formed from characters and images; (b) an image-storage apparatus configured to store the original monochromatic image created by the image input apparatus; (c) an image-formation apparatus configured to form an original multicolor image for output by combining a plurality of desired original monochromatic images from among the original monochromatic images stored in the image-storage apparatus; and (d) an image output apparatus configured to replace the original multicolor image formed by the image-formation apparatus with predetermined colors, and to output the original multicolor image; wherein the image input apparatus includes a display section displaying image information of the plurality of desired original monochromatic images from among the original monochromatic images stored in the image-storage apparatus.

Here, "original monochromatic image for output" may of course be a single color image, or may be a (full) color image. Further, "original multicolor image for output" may be a combination of images of respectively different colors, or a combination of images of the same color, or a combination of images whose respective colors are multicolor or a combination of (full) color images.

Further, an apparatus for image-formation in one embodiment according to the present invention is characterized in that the apparatus includes: (a) a first data input/output section configured to input an original monochromatic image for output from an external image input apparatus, the original monochromatic image formed from characters and images; (b) an image-storage section configured to store the original monochromatic image created by the external image input apparatus via the first data input/output section; (c) a control section configured to form an original multicolor image for output by combining a plurality of desired original monochromatic images from among the original monochromatic images stored in the image-storage section; and (d) a second data input/output section configured to output the original multicolor image formed by the control section to an external image output apparatus which replaces the original multicolor image with predetermined colors and outputs; wherein the control section outputs image information of the plurality of desired original monochromatic images from among the original monochromatic images stored in the image-storage section to a display section provided at the external image input apparatus via the first data input/output section.

Further, A computer-readable recording medium recording a program for image-formation in one embodiment according to the present invention is characterized in that the program includes: (a) selecting a plurality of original monochromatic image files for output from the plurality of desired original monochromatic image files for output, the original monochromatic image files formed from characters and images, and spooled in a queue; (b) rasterizing a plurality of image data from each of the selected original monochromatic image files; (c) displaying each rasterized image data at a display apparatus; and (d)

forming a original multicolor image file for output outputted from a multicolor image output apparatus by combining the plurality of image data displayed at the display apparatus.

Other objects, features, and effects of the present invention will become more apparent from the detailed description which will be given hereinafter with reference to the drawings.

BRIEF DESCRIPTION OF THE DRAWINGS

FIG. 1 is an explanatory figure of typical multicolor two-color printing.

DETAILED DESCRIPTION

Hereinafter, an embodiment of the present invention will be described on the basis of the drawings.

A first feature of the image-formation system of this embodiment is characterized in that the system includes: (a) an image input apparatus configured to create an original monochromatic image for output, the original monochromatic image formed from characters and images; (b) an image-storage apparatus configured to store the original monochromatic image created by the image input apparatus; (c) an image-formation apparatus configured to form an original multicolor image for output by combining a plurality of desired original monochromatic images from among the original monochromatic images stored in the image-storage apparatus; and (d) an image output apparatus configured to replace the original multicolor image formed by the image-formation apparatus with predetermined colors, and to output the original multicolor image; wherein the image input apparatus includes a display section displaying image information of the plurality of desired original monochromatic images from among the original monochromatic images stored in the image-storage apparatus.

Further, a second feature of the image-formation system of this embodiment is characterized in that, in addition to the above feature, the image-formation apparatus forms the original multicolor image for output by combining, in page units, the plurality of image information displayed at the display section.

Further, a third feature of the system for image-formation of this embodiment is characterized in that: in addition to the above features, the image-formation apparatus is configured to designate colors at a time of output from the image output apparatus, for the plurality of image information displayed at the display section; and the image-formation apparatus colors the plurality of image information displayed at the display section with the designated output colors from the image output apparatus, superposes the colored plurality of image information with output layout from the image output apparatus, and displays the colored and superposed plurality of image information at the display section.

Further, a fourth feature of the image-formation system of this embodiment is characterized in that the image information is thumbnail images with lowered resolutions.

Figure 2:
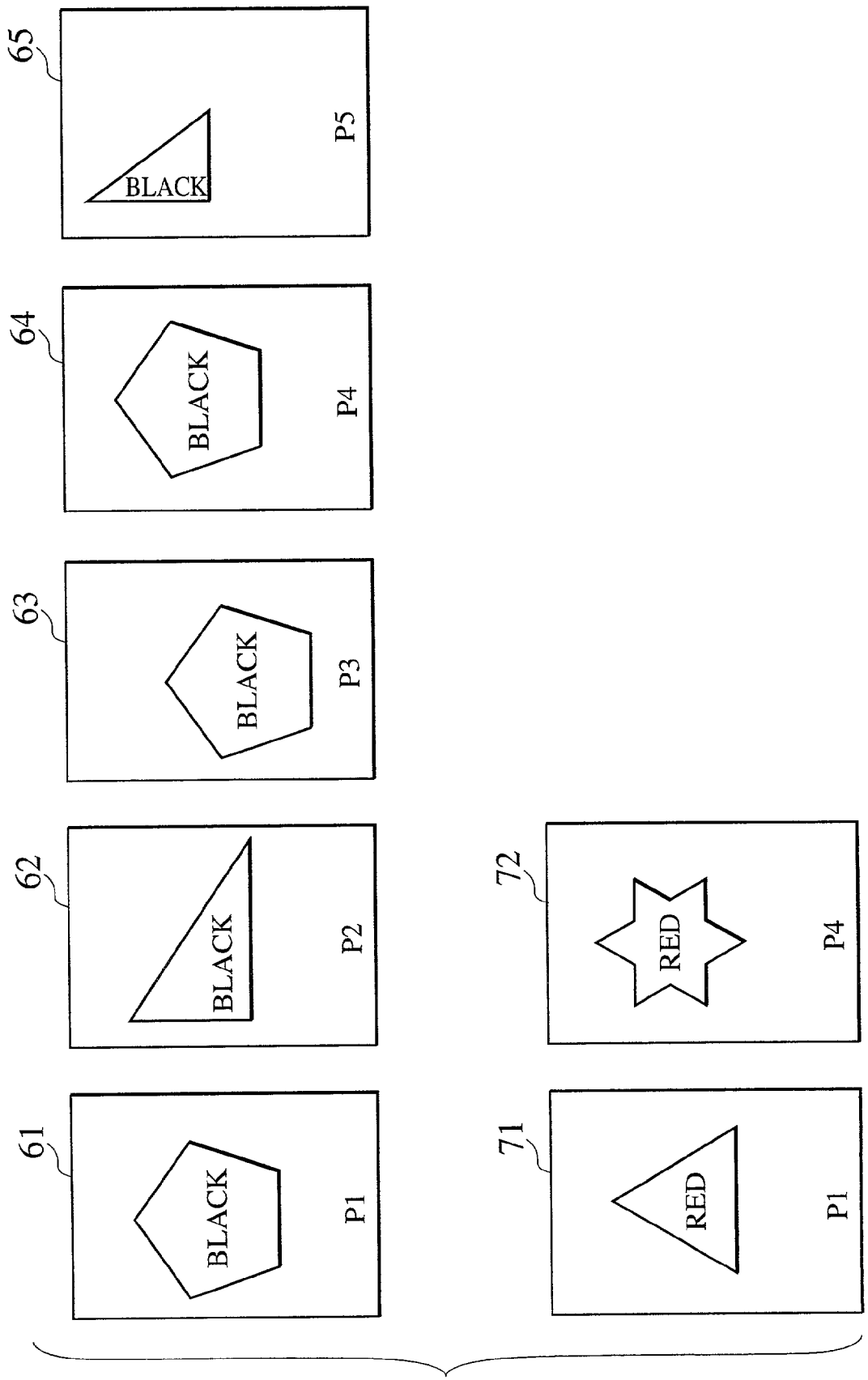
FIG. 2 is an explanatory figure of printing over a plurality of pages, in typical multicolor two-color printing.
Figure 3:
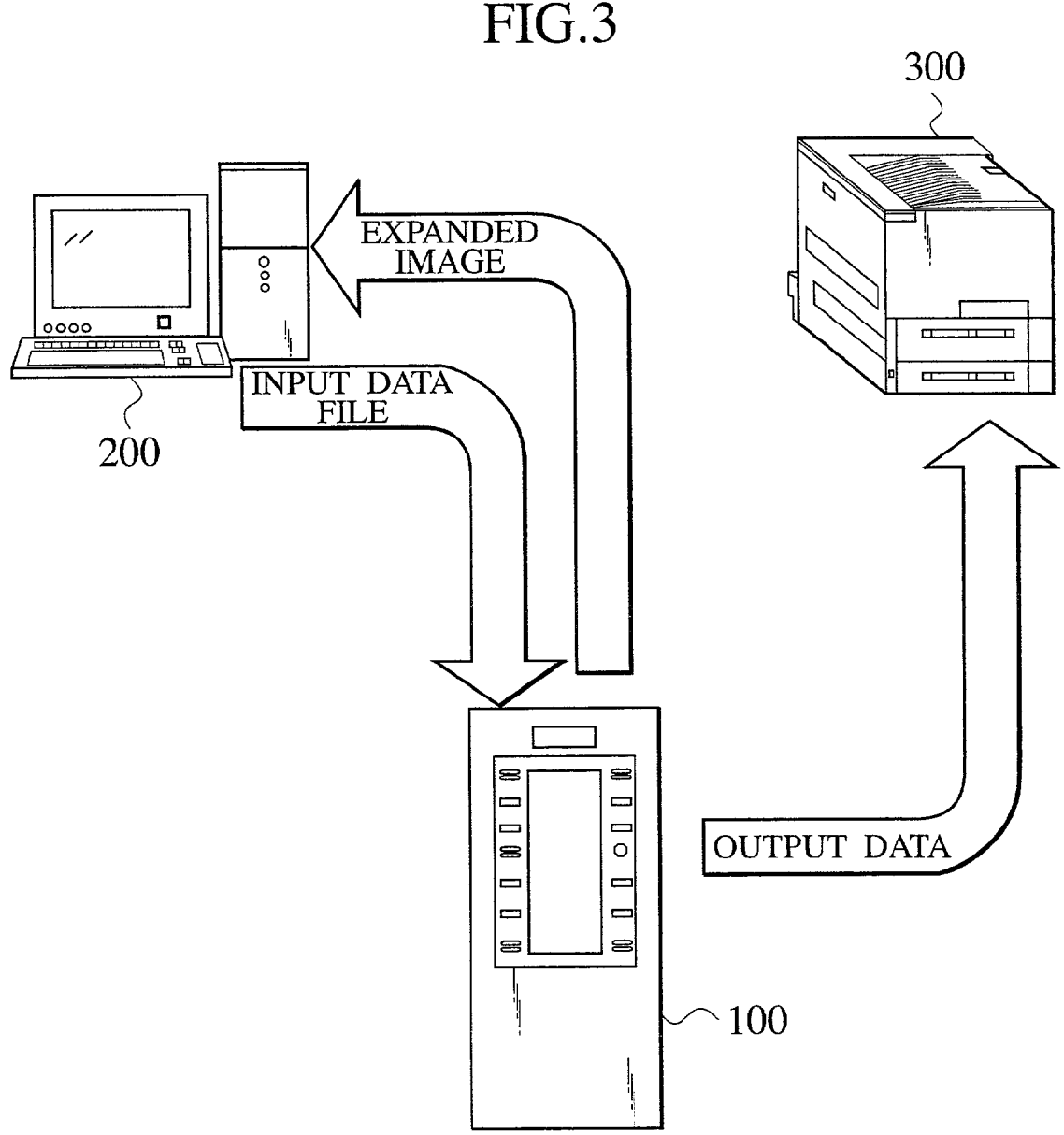
FIG. 3 is a schematic structural view showing an embodiment of an image-formation system relating to an embodiment of the present invention.

FIG. 3 is a schematic structural view relating to an embodiment of an image-formation system. As shown in FIG. 3, the image-formation system of the present embodiment is formed from a computer 200 which serves as an image input means, an image-formation apparatus 100 which serves as an image-formation means, and a multicolor printing apparatus 300 which serves as an image output means. The computer 200 creates original monochromatic images for output which are formed from characters and images. The image-formation apparatus 100 combines a plurality of desired original monochromatic images for output from the original monochromatic images for output, and forms an original multicolor image for output which is for printing. The multicolor printing apparatus 300 replaces the original multicolor image for output formed by the image-formation apparatus 100 with predetermined color inks, and carries out output.

Various types of application programs for creating original monochromatic images, formed from characters and images, are installed in the computer 200. The user utilizes these application programs, and creates original image data for desired printed matter. Further, although unillustrated, an image input apparatus such as an image scanner or the like can be connected to the computer 200, and the read original image data can be processed by the computer 200.

The image-formation apparatus 100, for example, is an RIP (Raster Image Processor; image generation output apparatus), and has a function where the original monochromatic image data for output, formed from characters and images and created at the computer 200, is stored/managed at a spool queue, a function where the original monochromatic image data for output is rasterized as a bitmap image data in order to, at the computer 200, reprocess and combine the original monochromatic image data for output which is spooled; and a function where processed and combined the original image data is outputted as original multicolor image data for output. Note that, a part of or all of the functions of the RIP can be softwareized, and can be installed in the computer 200.

The multicolor printing apparatus 300, for example, is a printing apparatus for two-color printing, and has a function where original multicolor image data for output, sent from the image-formation apparatus 100, is printed with two color inks combined together or with a classified by color inks or the like. Further, a scanner function for reading original images may be provided at the multicolor printing apparatus 300.

The queue which spools the original image data (printing job) may be provided at the image-formation apparatus 100 as described above, or at the computer 200 or at the printing apparatus 300, or in an apparatus which is connected to the image-formation apparatus 100, the computer 200, and the printing apparatus 300. Further, in FIG. 3, the image-formation apparatus 100, the computer 200, and the printing apparatus 300 are respectively independent structures. However, the respective functions thereof can be realized with a single computer apparatus.

Figure 4:
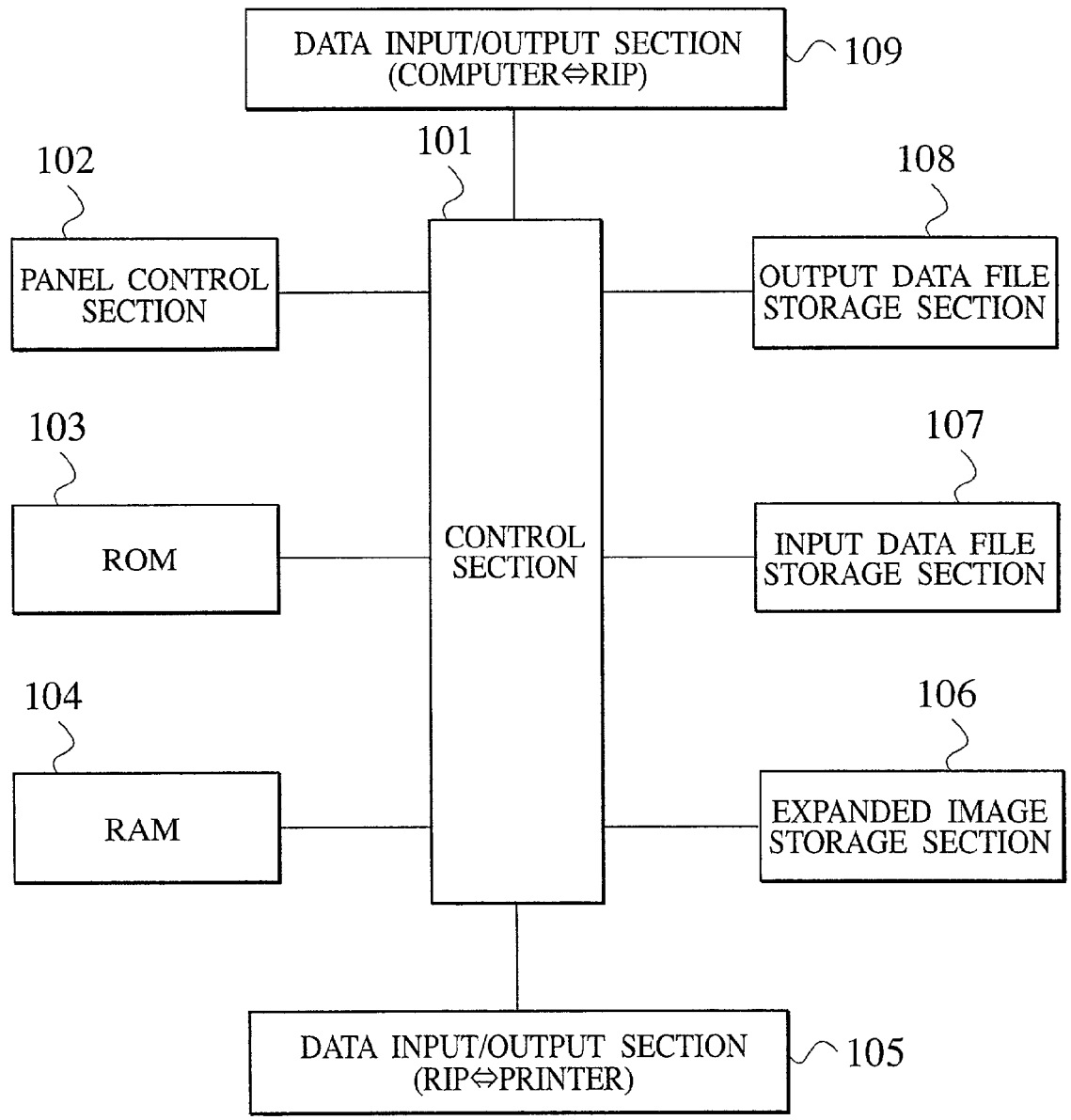
FIG. 4 is a block diagram showing image-formation apparatus relating to an embodiment of the present invention.

FIG. 4 is a block diagram showing an example of the electrical structure of the image-formation apparatus 100. As shown in FIG. 4, the image-formation apparatus 100 includes, as input/output interfaces with external apparatus, a data input/output section 109 which is an input/output interface with the computer 200, and a data input/output section 105 which is an input/output interface with the printing apparatus 300. Further, the image-formation apparatus 100 includes, as the data storing means, an input data file storage section 107, an expanded image storage section 106, and an output data file storage section 108. The input data file storage section 107 spools the original image data which is inputted from the computer 200. The expanded image storage section 106 stores, as a bitmap image data, the original monochromatic image data for output which is spooled by the input data file storage section 107. The output data file storage section 108 stores original multicolor image data for output where a plurality of original monochromatic image data for output, which is stored in the expanded image storage section 106, is combined. Further, the image-formation apparatus 100 includes a panel control section 102 by which various types of instructions and the like from the user are inputted, a ROM 103 in which various types of processing programs are stored, and a RAM 104 which is used for a temporary data storage area and a work area. In accordance with commands from the panel control section 102 and programs in the ROM 103, or in accordance with programs and commands and the like in the computer 200, a control means 101 carries out the operation control of the aforementioned respective structural elements. Note that the panel control section 102 includes an input portion which receives instructions from the user, and a display section which displays information outputted from the image-formation apparatus.

The series of processing procedures which are carried out by the image-formation system and the image-formation apparatus 100 can be recorded on various types of recording media or can be transferred by a communication medium and distributed, as an image-formation program for execution by a computer or the like which forms the image-formation system. A computer which realizes the image-formation system is controlled by the aforementioned image-formation program which is recorded on a recording medium, and executes processings by the predetermined processing procedures, as exemplified in FIG. 5.

Figure 5:
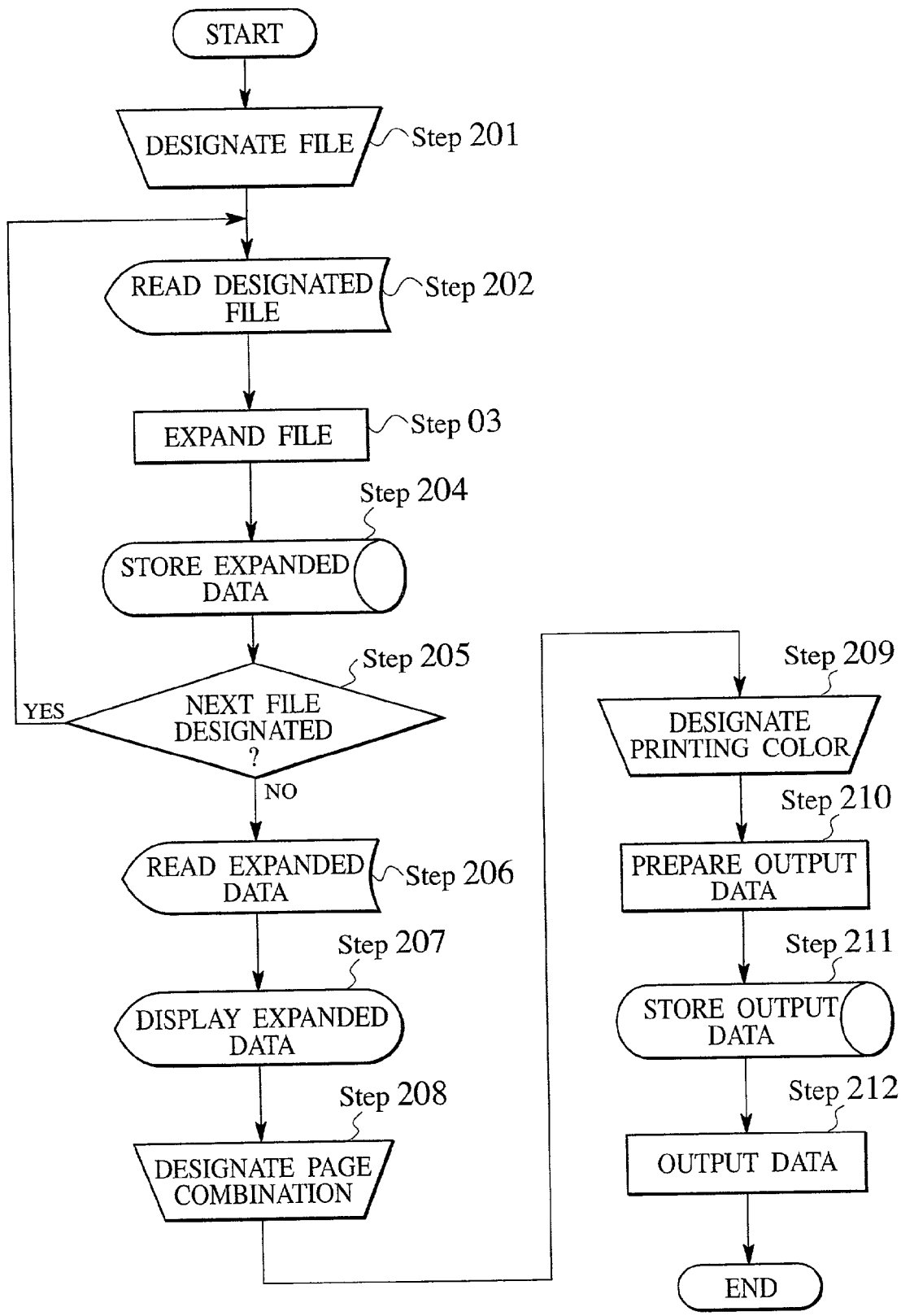
FIG. 5 is a flowchart showing an example of processing procedures of an image-formation program relating to an embodiment of the present invention.

In FIG. 5, first, it is as preparation, the user creates an image data file, which is to be the original image, using the application programs in the computer 200, and designates the image-formation apparatus 100 as the output unit destination at the time of printing by a printer driver or the like, and instructs for printing. The original created image data file is spooled at the input data file storage section 107 of the image-formation apparatus as an original monochromatic image data file for output. Note that, at the input data file storage section 107, a plurality of original monochromatic image data files for output can be made to queue, and data which is frequently used such as fixed form document data, overlay format data, and the like, can be registered.

Note that the original monochromatic image for output in the present embodiment may of course be a monochromatic image, or may be a multicolor image or a (full) color image. Further, the original multicolor image for output may of course be a combination of images of respectively different colors, or may be a combination of images of the same color, or may be a combination of images whose respective colors are multicolor or a combination of (full) color images.

Next, the user starts up a utility program in the computer 200, and selects/designates the original monochromatic image data file for output which is spooled at the input data file storage section 107 of the image-formation apparatus 100 (Step 201).

Figure 6:
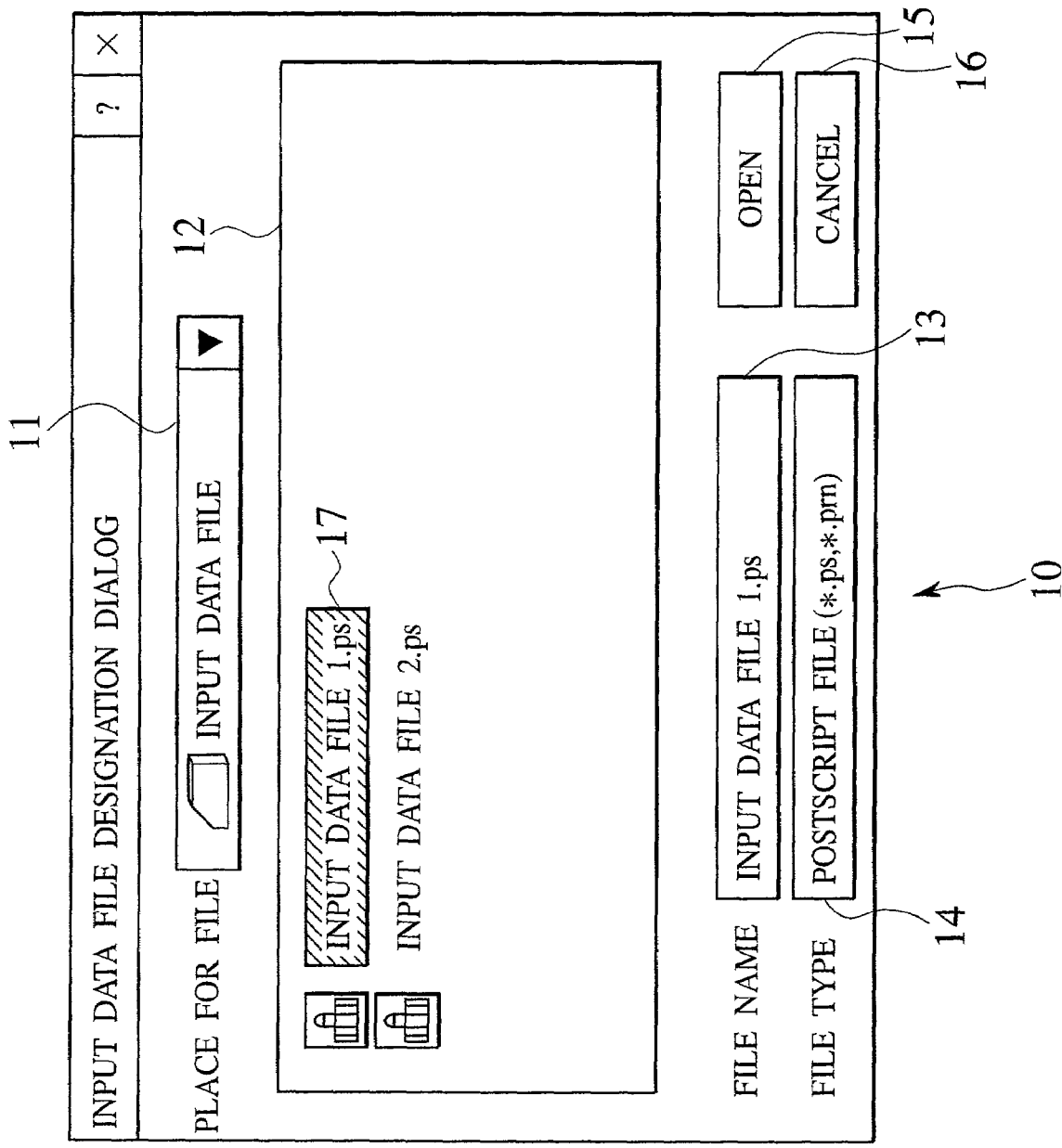
FIG. 6 is an image figure showing an example of the display of an input data file-designating dialog.

An example of the layout of an input data file designation dialog 10 which is displayed on the computer 200 at this time is shown in FIG. 6. This dialog is formed with a storage place selection column 11, a file selection column 12, a file name designation column 13, a file type selection column 14, an execution button 15, a cancellation button 16, and the like. The storage place selection column 11 is a field for selecting the storage place of the original monochromatic image data file for output. The file selection column 12 is a field for displaying in a list of the original monochromatic image data files for output stored in a place selected by the storage place selection column 11, and for alternatively selecting a file therefrom. The file name designation column 13 is a field for directly designating the file name. The file type selection column 14 is a field for selecting the file type. The execution button 15 is a button for executing an original monochromatic image data file for output 17 which is selected, and the cancellation button 16 is a button which is for canceling processing procedure.

Next, the image-formation apparatus 100 reads into the RAM 104 the original monochromatic image data for output which is selected and designated (Step 202), and rasterized the data as a painted out bitmap image data, and stores the image at the expanded image storage section 106 (Step 203 through Step 204).

If yet another original monochromatic image data file for output is selected and designated by the user, the processing procedure is returned to Step 202, and in a case where there are no more designated original monochromatic image data files for output, the processing procedure proceeds to the next step (Step 205).

When the file expansion processing procedure is completed, the image-formation apparatus 100 reads out the bitmap image data stored in the expanded image storage section 106, and transmits the bitmap image data to the computer 200 (Step 206).

Figure 7:
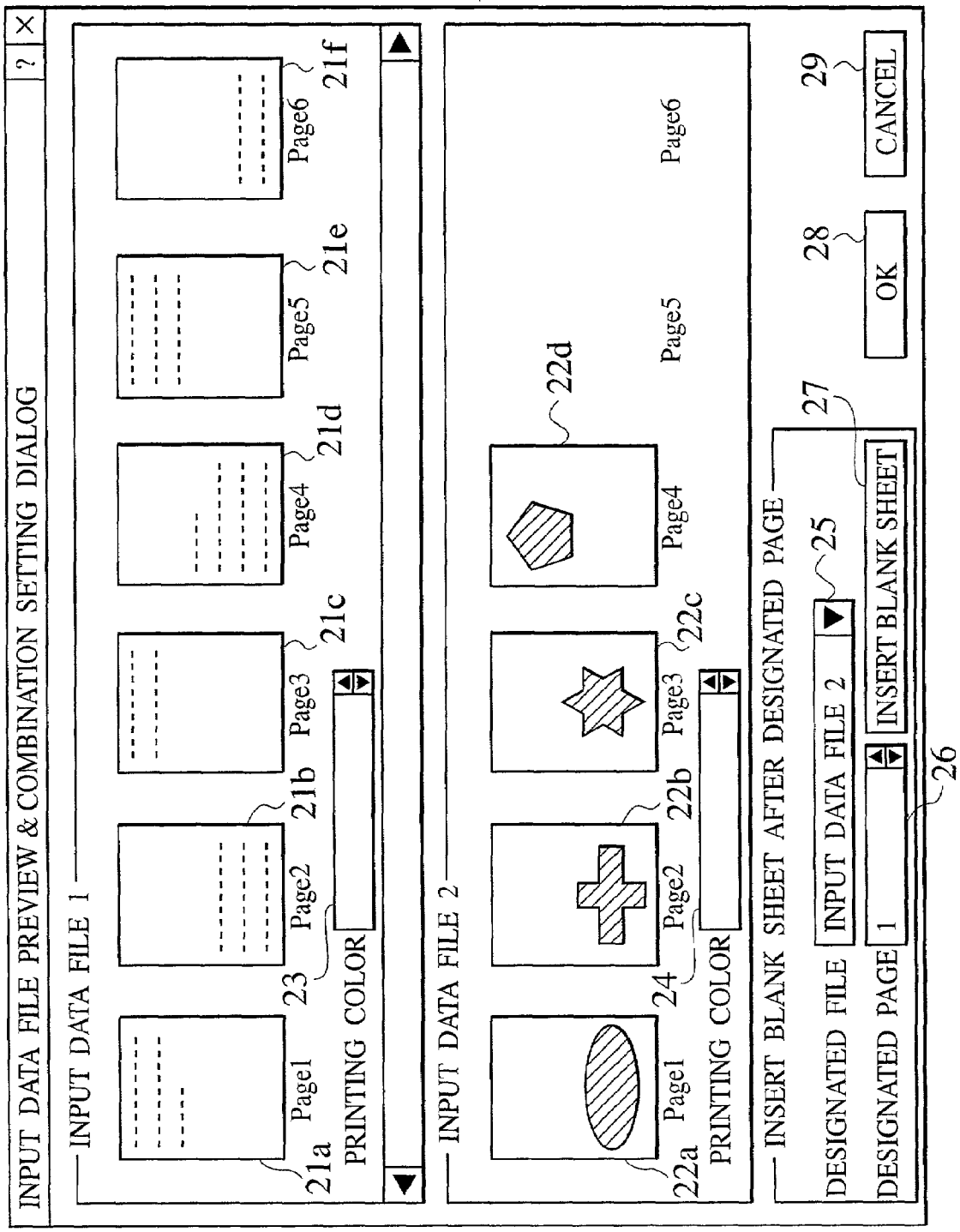
FIG. 7 is an image figure showing an example of the display of an input data file preview & combination setting dialog.

Therefore, in the computer 200, the bitmap image data which was transmitted from the image-formation apparatus 100 is displayed at an input data file preview & combination setting dialog 20 as shown in FIG. 7 (Step 207).

As shown in FIG. 7, at the input data file preview & combination setting dialog 20, the rasterized images of two original monochromatic image data for output, "input data file 1" and "input data file 2", are displayed. In this display example shown in FIG. 7, six pages of images 21a through 21f of the "input data file 1" are displayed in the upper portion, and four pages of images 22a through 22d of the "input data file 2" are displayed at the lower portion. The following combinations are displayed.

(1) image 21a+image 22a
(2) image 21b+image 22b
(3) image 21c+image 22c
(4) image 21d+image 22d
(5) image 21e
(6) image 21f In a case where printing is carried out with a combination displayed here, when the execution button 28 is clicked, the two original monochromatic image data for output, "input data file 1" and "input data file 2" are combined together, so as to create the original multicolor image data for output. To a contrary, in a case where the file is to be re-selected, due to the cancellation button 29 being clicked, the processing procedure is returned to the input data file designation dialog 10 shown in FIG. 6.

In this way, the two original monochromatic image data for output "input data file 1" and "input data file 2", are independent of each other, are rasterized in page units and are displayed in a row on the screen. The contents of the image and the state of the combination of the pages can thereby be presented to the user in an easy-to-understand manner, and the user can instruct for printing after visually confirming the displayed contents on the screen.

Due to the images 21, 22, displayed at the input data file preview & combination setting dialog 20, being thumbnail images with a lowered resolution, the data size of the images is reduced, and higher speed operation is possible.

Returning to FIG. 5, the user can designate the combination of pages on the input data file preview & combination setting dialog 20 (Step 208).

Figure 8:
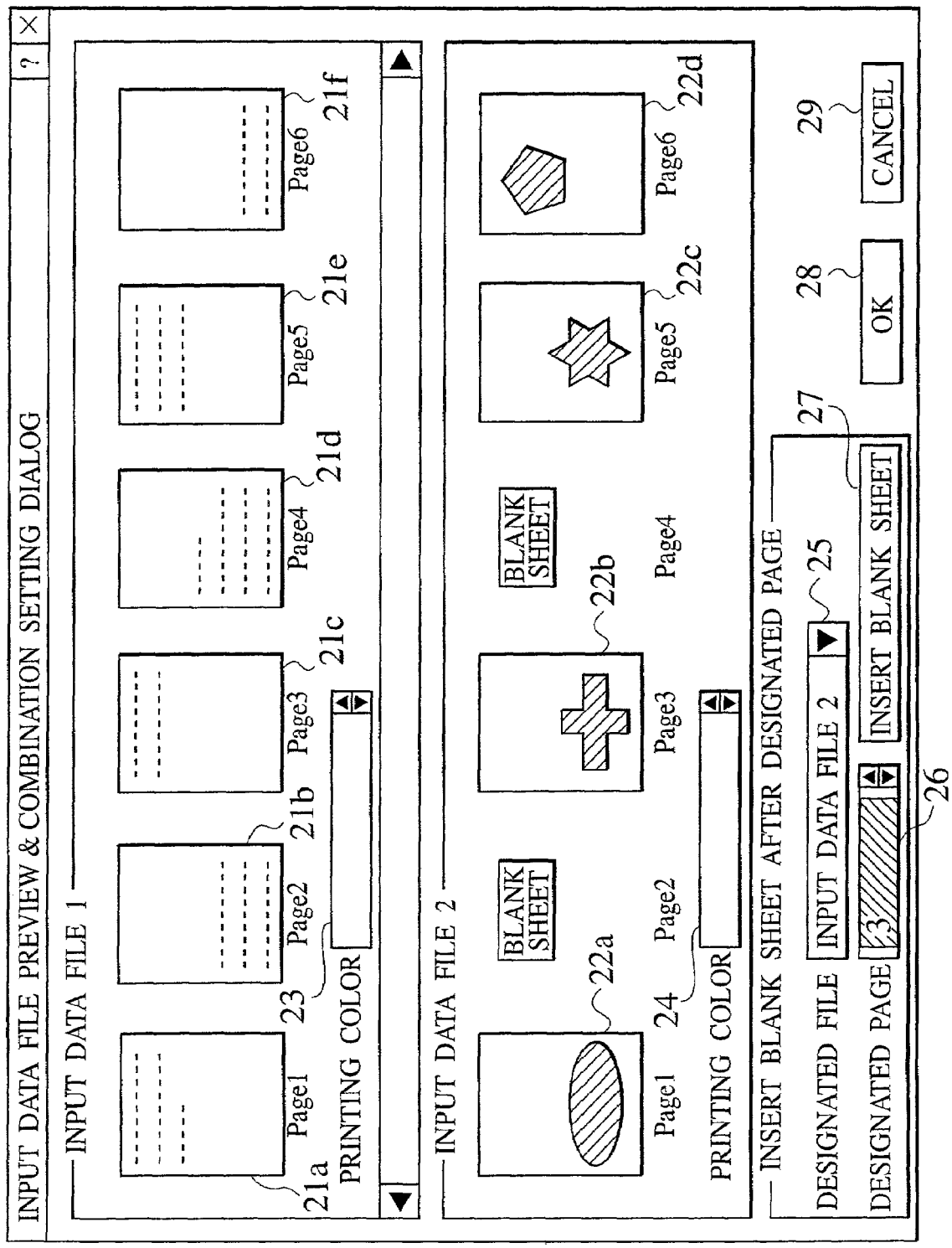
FIG. 8 is an image figure showing an example of the setting of page combination setting functions at the input data file preview & combination setting dialog shown in FIG. 7.

An example of the display of the input data file preview & combination setting dialog 20 at this time is shown in FIG. 8. As shown in the figure, a page insert column 27 in which a single blank sheet is inserted after a designated page by the page designation column 26 of a designated file by the file designation column 25 is provided. In this example, a single blank sheet is inserted after the first page of "input data file 2", and moreover, a single blank sheet is inserted after the third page. Therefore, the combinations of the pages are changed as follows.

(1) image 21a+image 22a
(2) image 21b
(3) image 21c+image 22b
(4) image 21d
(5) image 21e+image 22c
(6) image 21f+image 22d In this way, in a case where it is desired to change the combination, the changing operation can be carried out while the states before and after changing are visually confirmed. The user can confirm whether the desired combination of pages has been achieved, and original multicolor image data for output which is just as intended can be outputted to the printing apparatus.

Returning to FIG. 5 again, the user can designate the colors at the time of printing for the original monochromatic images for output of "input data file 1" and "input data file 2" on the input data file preview & setting dialog 20 (Step 209).

Figure 9:
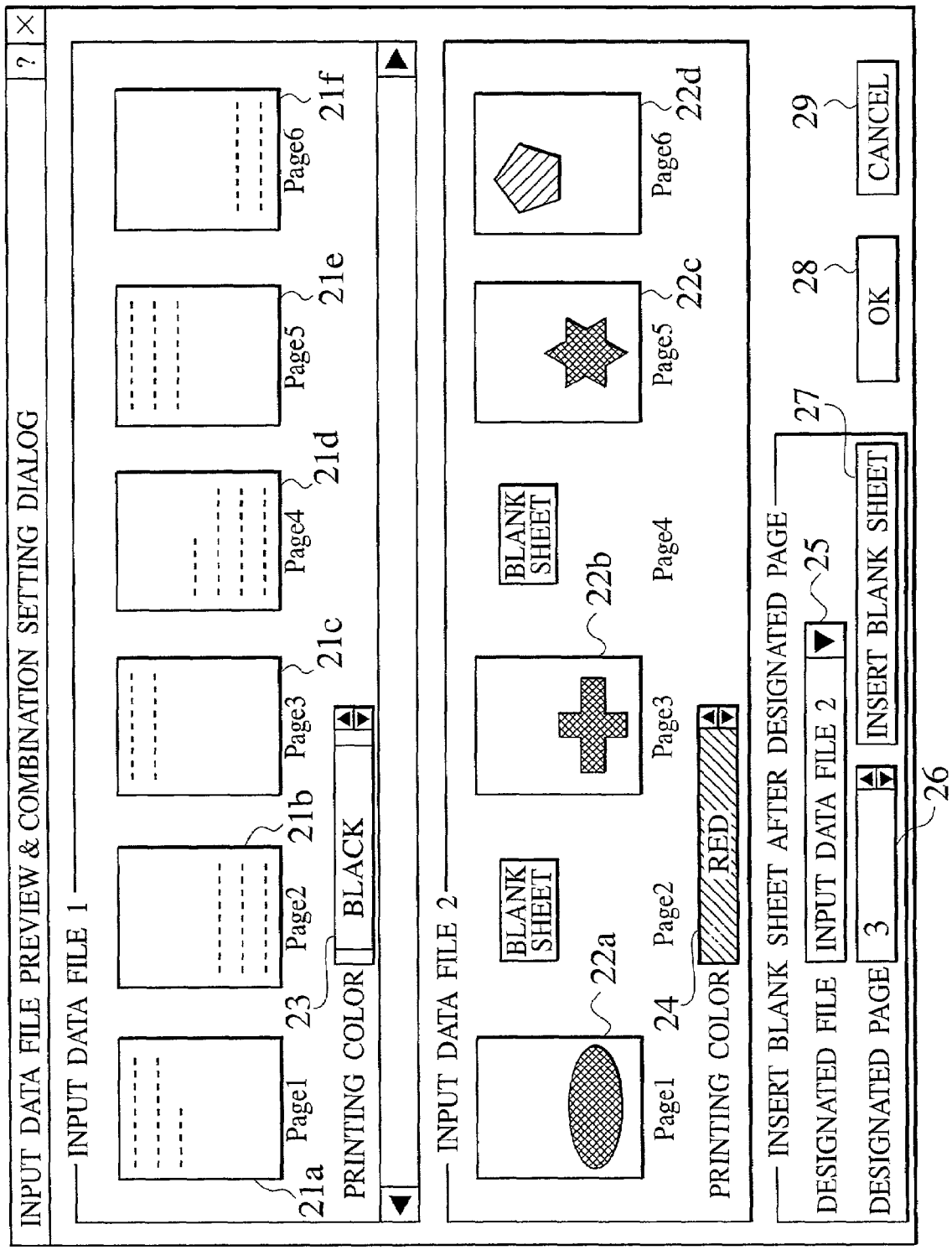
FIG. 9 is an image figure showing an example of the setting of print color setting functions at the input data file preview & combination setting dialog shown in FIG. 7.

An example of the display of the input data file preview & combination setting dialog 20 at this time is shown in FIG. 9. In the illustrated example, setting by the printing color selection column 23 of the printing color of the "input data file 1" is "black", and setting by the printing color selection column 24 of the printing color of the "input data file 2" is "red". At this time, if the display is updated so that the colors of images displayed in the dialog in the colors which are respectively designated, confirmation is even easier. If this function is used, in a case where the user wishes to change the color of the original monochromatic image for output from the printing color at the time of initial preparation to another printing color, the changing operation can be carried out while visually confirming the states before and afterwards. Original multicolor image data for output which is as intended can be outputted to the printing apparatus.

Note that the method of designating the printing color for the original monochromatic image for output may be, other than a method in which the user carries out designation manually from a screen such as shown in FIG. 9, a method in which the image-formation apparatus 100 acquires color information via the data input/output section 105 about the inks which are loaded in the printing apparatus 300 and setting is carried out automatically, or a method in which an automatic or manual setting can be selected at the dialog by the user.

Figure 10:
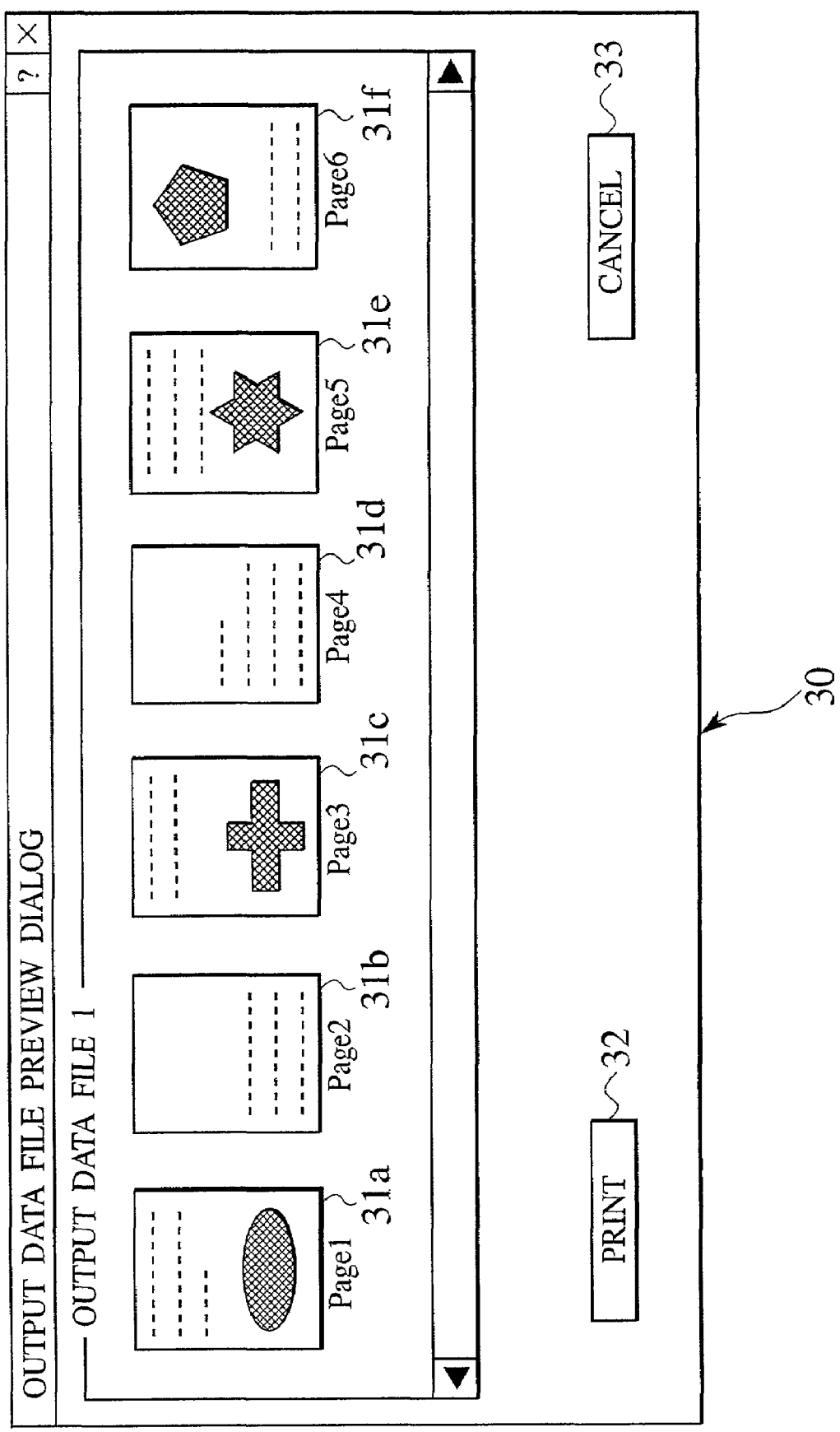
FIG. 10 is an image figure showing an example of the display of an output data file preview dialog.

In a case where printing is carried out in accordance with the setting contents described above, if the execution button 28 is clicked, the two original monochromatic image data for output, "input data file 1" and "input data file 2", are combined together, so as to create the original multicolor image data for output, and the created results are displayed on an output data file preview dialog 30 as shown in FIG. 10 (Step 210). Further, the created original multicolor image data file for output is stored in the output data file storage section 108 (Step 211).

As shown in FIG. 10, in this example, the images 31a through 31f of "output data file 1" of the original multicolor image data for output, created by combining the two original monochromatic image data for output, "input data file 1" and "input data file 2", are displayed in page units (the first through the sixth pages). The user can confirm visually that the combined contents and the like which were set at the preview & combination setting dialogs 20 up through FIG. 9 are correctly expressed.

In a case where printing is carried out in accordance with the contents displayed on the output data file preview dialog 30 of FIG. 10, if the execution button 28 is clicked, the image-formation apparatus 100 transmits the original multicolor image data file for output, stored in the output data file storage section 108, to the printing apparatus 300 via the data input/output section 105 (Step 212). Then, the printing apparatus 300 which has received the original multicolor image data carries out print-processing in accordance with the designated printing color.

Note that the designation of the combination of pages in Step 208 may be carried out not only by using the method of inserting blank sheets as described above, but also by using another designation method.

Figure 11:
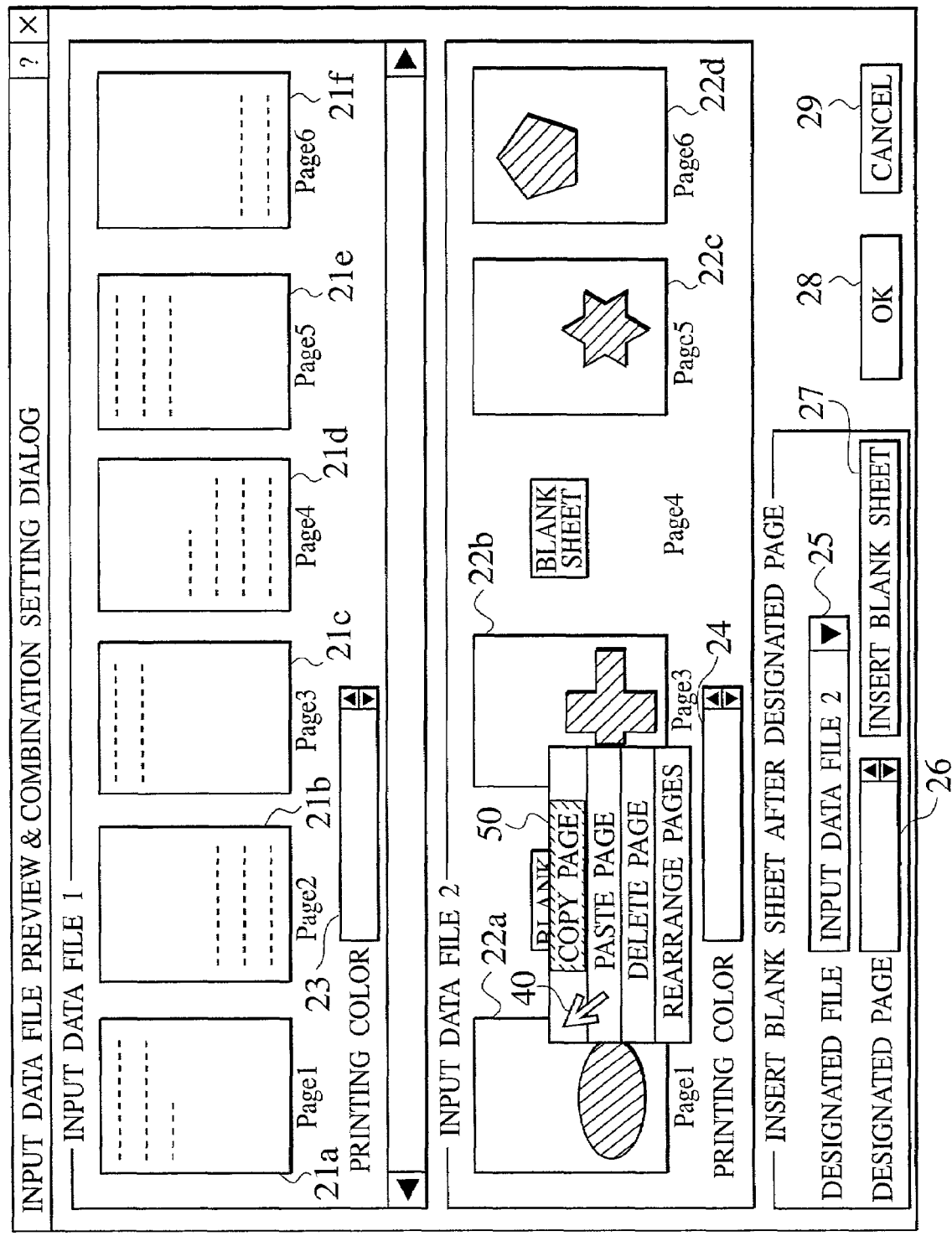
FIG. 11 is an image figure showing an example of the display of a page-editing window at the input data file preview & combination setting dialog shown in FIG. 8.

An example of the display of the input data file preview & combination setting dialog 20 by another designation method is shown in FIG. 11. When a mouse cursor 40 is set at the image of a desired page and the right-hand side button of the mouse is clicked (right click), as illustrated in the figure, a page editing window 50 opens. The page editing window 50 is structured to alternatively select functions such as "copy page", "paste page", "delete page", "rearrange pages", and the like.

"Copy page" is a function by which the image data of the page which is designated on the screen is transferred to a clipboard (a temporary storage area of data), and "paste page" is a function by which the image data in the clipboard is pasted to the desired page. For example, if the mouse cursor 40 is set at the image 22a of the first page and "copy page" is selected, the data of the image 22a is at once transmitted to and stored in the clipboard. Then, when the mouse cursor 40 is set at the blank sheet of the fourth page and "paste page" is selected, the image 22a which is stored in the clipboard is pasted to the fourth page. In this way, the same image 22a is pasted to the first page and the fourth page of the input data file 2.

"Delete page" is a function by which the image data of the page which is designated on the screen is deleted. For example, if the mouse cursor 40 is set at the image 22b of the third page and "delete page" is selected, the image 22b of the third page is deleted. Note that, at this time, it is possible to enable selection of the deletion of the page and bringing up the following pages, or of leaving the page that was deleted a blank page.

"Rearrange pages" is a function by which the image data of the page which is designated on the screen is moved to a desired page. For example, if the mouse cursor 40 is set at the image 22b of the third page and "rearrange pages" is selected, and further, if a window (not illustrated) designating the page number of the movement place is opened and "Page 5" is selected here, the image 22b of the third page is moved to the fifth page.

As described above, in accordance with the present embodiment, in a case where multicolor printing is carried out by combining original monochromatic images for output, the setting and the confirmation of the combinations of the original monochromatic images for output can be easily carried out. An image-formation system, an image-formation apparatus, and a recording medium which is readable by a computer and on which an image-formation program is recorded, are for forming a original image by which printed matter can be obtained just as was intended by the user.

Namely, in accordance with a first feature of the present embodiment, due to a plurality of original monochromatic image data for output which are independent of one another being rasterized in page units and displayed in a row on a screen, the contents of the image and the state of the combination of the pages can be presented to the user in an easy-to-understand manner, and the user can instruct for printing after visually confirming the displayed contents on the screen.

In accordance with a second feature of the present embodiment, in a case where it is desired to change the combination, the changing operation can be carried out while the states before and after changing are visually confirmed. The user can confirm whether the desired combination of pages has been achieved, and original multicolor image data for output which is just as intended can be outputted to the printing apparatus.

In accordance with a third feature of the present embodiment, even in a case where the color of the original monochromatic image for output is changed from the printing color at the time of initial preparation to another printing color, the changing operation can be carried out while visually confirming the states before and afterwards, and the intended original multicolor image data for output can be outputted to the printing apparatus. Further, it can be visually confirmed that the combination contents and the like as set by the preview function has been correctly expressed.

In accordance with a fourth feature of the present embodiment, due to the images displayed in the respective dialogs being thumbnail images with lowered resolutions, the data size of the images is reduced, and higher speed operation is possible.

An embodiment of the present invention has been described above in detail. However, the present invention is not limited to the present embodiment, and various improvements and changes can be made within a scope which does not deviate from the gist of the present invention.

For example, the respective dialogs of FIG. 6 through FIG. 10 which are described in the present embodiment are displayed on the screen of the computer 200, and show examples in which the user gives various types of instructions and the like from the computer 200 while viewing the dialogs. However, the present invention is not limited to the same, and, for example, a part or all of the aforementioned dialogs may be displayed on the operation panel of the image-formation apparatus 100 or on the operation panel of the printing apparatus, and instructions may be given therefrom.

Further, in the present embodiment, an example in which the printing apparatus 300 for two-color printing and two original monochromatic images for output are combined is shown. However, the number of colors of the printing apparatus 300 and the number of files of the original monochromatic images for output to be combined are not limited to this. The printing apparatus 300 for three-color printing or which uses even more colors may be used, and the number of files of original monochromatic images for output may be three files or more.

What is claimed is:

1. A system for image-formation comprising:
    an image input apparatus configured to create a plurality of original monochromatic image files for output, each of the plurality of original monochromatic image files including a plurality of image pages formed from characters and images;

an image-storage apparatus configured to store the plurality of original monochromatic image files created by the image input apparatus;

an image-formation apparatus configured to form an original multicolor image file for output by selecting a plurality of desired original monochromatic image files from among the plurality of original monochromatic image files stored in the image-storage apparatus and combining the plurality of selected original monochromatic image files in page units; and an image output apparatus configured to replace the original multicolor image file formed by the image-formation apparatus with predetermined colors and output the original multicolor image file;

wherein at least one of the image input apparatus, the image output apparatus, and the image-formation apparatus includes a display section displaying collectively the plurality of image pages of each of the plurality of selected original monochromatic image files for each file, prior to combining said plurality of selected original monochromatic image files in page units.

2. The system according to claim 1, wherein the image-formation apparatus is configured to designate colors at a time of output from the image output apparatus, for the plurality of image pages displayed at the display section; and the image-formation apparatus colors the plurality of image pages displayed at the display section with the designated output colors of the image output apparatus, superposes the plurality of colored image pages with output layout from the image output apparatus, and displays the plurality of colored and superposed image pages at the display section.

3. The system according to claim 1, wherein the plurality of image pages are thumbnail images with lowered resolutions.

4. An apparatus for image-formation comprising:

a first data input/output section configured to input a plurality of original monochromatic image files for output from an external image input apparatus, the plurality of original monochromatic image files including a plurality of image pages formed from characters and images;

an image-storage section configured to store the plurality of original monochromatic image files created by the external image input apparatus via the first data input/output section;

a control section configured to form an original multicolor image file for output by selecting a plurality of desired original monochromatic image files from among the plurality of original monochromatic image files stored in the image-storage section and combining the plurality of selected original monochromatic image files in page units; and a second data input/output section configured to output the original multicolor image file formed by the control section to an external image output apparatus which replaces the original multicolor image file with predetermined colors and outputs;

wherein the control section outputs collectively the plurality of image pages of each of the plurality of selected original monochromatic image files for each file to a display section provided at the external image input apparatus itself or via at least one of the first data input/output section and the second data input/output section, prior to combining said plurality of selected original monochromatic files in page units.

5. The apparatus according to claim 4, wherein the control section is configured to designate colors at a time of output from the external image output apparatus, for the plurality of image pages displayed at the display section; and the control section colors the plurality of image pages displayed at the display section with the designated output colors from the external image output apparatus, superposes the plurality of colored image pages with output layout from the external image output apparatus, and displays the plurality of colored and superposed image pages at the display section.

6. The apparatus according to claim 4, wherein the plurality of image pages are thumbnail images with lowered resolutions.

7. A computer-readable recording medium for recording a program for image-formation, the program comprising:

selecting a plurality of desired original monochromatic image files from among a plurality of original monochromatic image files for output, the plurality of original monochromatic image files including a plurality of image pages formed from characters and images, and spooled in a queue;

rasterizing the plurality of image pages of each of the plurality of selected original monochromatic image files;

displaying collectively the plurality of rasterized image pages of each of the plurality of selected original monochromatic image files at a display apparatus for each file; and forming an original multicolor image file for output by combining the plurality of original monochromatic image files in page units, prior to combining said plurality of selected original monochromatic image files in page units.

8. The recording medium according to claim 7, the program further comprising:

determining how to combine the plurality of image pages of an original monochromatic image file, having a maximum number of image pages, of the plurality of selected original monochromatic image files with the plurality of image pages of each of other original monochromatic image files.

9. The recording medium according to claim 7, the program further comprising:

designating colors at a time of output from the image output apparatus, for the plurality of image pages displayed at the display section; and coloring the plurality of image pages displayed at the display apparatus with the designated output colors of the image output apparatus, superposing the plurality of colored image pages with output layout from the image output apparatus, and displaying the plurality of colored and superposed image pages at the display apparatus.

10. The recording medium according to claim 7, wherein the plurality of image pages are thumbnail images with lowered resolutions.

11. The system according to claim 1, wherein the image-formation apparatus enables a blank page to be inserted between the plurality of image pages of each of the plurality of original monochromatic image files.

12. The system according to claim 1, wherein the image-formation apparatus enables at least one function to be selected, the function including copying a page, pasting a page, deleting a page, and rearranging pages.

13. The recording medium according to claim 7, wherein a blank page is enabled to be inserted between the plurality of image pages of each of the plurality of original monochromatic image files.

14. The recording medium according to claim 7, wherein at least one function is selectable, the function including copying a first page, pasting a page, deleting a page and rearranging pages.

15. The system according to claim 1, wherein the image-formation apparatus determines how to combine the plurality of image pages of an original monochromatic image file, having a maximum number of image pages, of the plurality of selected original monochromatic image files with the plurality of image pages of each of other original monochromatic image files.

16. The apparatus according to claim 4, wherein the control section determines how to combine the plurality of image pages of an original monochromatic image file, having a maximum number of image pages, of the plurality of selected original monochromatic image files with the plurality of image pages of each of other original monochromatic image files.

17. The apparatus according to claim 4, wherein a blank page is enabled to be inserted between the plurality of image pages of each of the plurality of original monochromatic image files.

18. The apparatus according to claim 4, wherein at least one of functions is selectable, the functions including copying a page, pasting a page, deleting a page, and rearranging pages.

19. An apparatus for image-formation comprising:

a first data input/output section configured to input a plurality of original monochromatic images for output from an external image input apparatus, the plurality of original monochromatic images being formed from characters and images;

an image-storage section configured to store the plurality of original monochromatic images created by the external image input apparatus via the first data input/output section as a plurality of original monochromatic image files, each of the plurality of original monochromatic image files including one or more pages;

a control section configured to form an original multicolor image for output by selecting a plurality of desired original monochromatic image files from among the plurality of original monochromatic images stored in the image-storage section and combining one original monochromatic image file, having a maximum number of pages, of the plurality of selected original monochromatic image files and each of other original monochromatic image files of the plurality of selected original monochromatic image files in page units, the original multicolor image for output having the maximum pages; and a second data input/output section configured to output the original multicolor image formed by the control section to an external image output apparatus which replaces the original multicolor image with predetermined colors and outputs;

wherein the control section outputs collectively as a group the one or more pages of each of the plurality of selected original monochromatic image files to a display section provided at the external image input apparatus itself or via at least one of the first data input/output section and the second data input/output section, wherein the control section allows the display section to display a plurality of groups prior to combining said plurality of selected original monochromatic image files.

* * * * *